Patented Mar. 16, 1943

2,314,022

UNITED STATES PATENT OFFICE 2,314,022

TREATMENT OF WELLS

John B. Stone, Tulsa, Okla., assignor to The Dow Chemical Company, Midland, Mich., a corporation of Michigan No Drawing. Application July 31, 1940, Serial No. 348,819

4 Claims. (Cl. 252—8.55)

The invention relates to the treatment of oil wells. It more particularly concerns an improved method of treating oil wells with acids to bring about an increased production of the desired mineral fluid.

It is now conventional practice to treat oil wells, particularly those drilled into calcareous producing strata with a charge of aqueous hydrochloric acid which attacks the calcareous matter, enlarging the flow channels and pores of the formation. In this manner greater drainage area is provided with consequent increased flow of the desired mineral fluid. It is common knowledge that the expected increase in production does not materialize in all cases and these poor results are oftentimes due to the formation of an emulsion between the aqueous acid solution and the oil as the two solutions are caused to come into intimate contact with each other during the stage of the treatment when the acid is forced into the formation through small pores and flow channels containing oil. Such emulsions, usually consisting of very finely dispersed droplets of acid in oil, are oftentimes very thick viscous mixtures which do not flow readily in the small pores and thus act to partially or completely plug the producing stratum so that normal flow is not restored after the acid treatment. It has been proposed to add to the acid solution being employed for the treatment an agent soluble in the acid and capable of breaking or resolving the emulsion of the type tending to form, or an agent that will prevent an emulson from forming. However, demulsifying agents of the type soluble in the acid are oftentimes ineffective to break or prevent the formation of emulsion of the type oftentimes formed during a conventional acid treatment. If an attempt is made to employ acid-insoluble demulsifying agents which may be inherently suitable for breaking a particular emulsion, generally unsatisfactory results are obtained because the demulsifier being insoluble is not widely distributed at the interface as the acid and oil emulsify so as to effectively operate to break the emulsion or prevent its forming.

It is, therefore, the principal object of the invention to provide a method whereby an acid treatment of an oil well may be carried out and the possibility of a thick viscous emulsion forming practically eliminated. Another object is to provide a method of treatment whereby acid insoluble demulsifying agents are rendered highly effective.

Other objects and advantages will be apparent as the description of the invention proceeds.

The present invention resides in the discovery that by introducing into a well an acid solution which contains an acid-insoluble demulsifying agent emulsified in the acid solution greatly improved results are obtained as regards effectively preventing the formation of an emulsion between acid and oil, and further, should such an emulsion be formed, it is rapidly broken or resolved. Many acid-insoluble or partially insoluble demulsifying agents can be dispersed or emulsified in acid to produce a solution of a highly mobile nature which flows through the smallest of pores with the facility of an ordinary acid solution.

In carrying out the method of the invention in a well equipped with the usual casing and tubing wherein a calcareous producing stratum is to be treated with an aqueous solution of hydrochloric acid, the well is first filled with oil in accordance with the teaching of the Carr process described in U. S. Patent No. 1,891,667, and thereafter the acid solution having the demulsifying agent emulsified therewith is introduced into the well through the tubing while oil is allowed to escape at the casing head. When an amount of acid sufficient to fill the well tubing has been introduced, the casing head is closed in and the acid solution displaced into the formation as by pumping in additional quantity of acid into the well, or, if the desired quantity of acid has already been introduced by supplying additional oil to the well through the tubing whereby the acid in the tubing is displaced into the formation. After the desired quantity of acid has been introduced in the above manner, the well may be closed in for sufficient time to allow the acid to react with the formation. After a length of time required for reaction to take place, the well may be opened and the spent or partially spent solution removed from the well, as by pumping or bailing the well. Thereafter the well may be put into production in the conventional manner.

Although the method has been described with particular reference to carrying out the treatment by first loading the well with oil, it is to be understood that the introduction of the acid having the demulsifying agent emulsified therewith may be carried out in any other convenient manner, such as by introducing the acid mixture into the well through the casing after the oil has been removed therefrom or by merely allowing the treating solution to drop through the oil in the casing and thereafter applying sufficient pressure to displace it into the surrounding formation. While the method will be mainly employed wherein the improved treating mixture is forced deeply into the formation, it is to be understood that when an acid treatment is carried out in the well bore, it may be desirable to employ an acid solution containing an emulsified demulsifying agent to prevent an emulsion between acid and any oil that may be present in the well bore.

In the foregoing manner, a well may be acid treated without the danger of producing troublesome emulsions such as are oftentimes formed when an acid-soluble demulsifying agent is employed or when an insoluble demulsifying agent is merely added to the acid solution.

Illustrative of demulsifying agents which may be employed in accordance with the invention are cresylic acid, thymol, guaiacol, and the like. Many agents possessing similar characteristics are also commercially obtainable. For example, I have found that Tretolite X9 and X15, obtainable from the Tretolite Company, are highly suitable. In addition, agents sold by the Visco Products Company, Inc., under the trade names of RM-6, RM-20, RM-67, and RM-70 and 242-A give highly desirable results when employed for the purpose at hand. Various other commercially available agents of an acid or partially acid-insoluble nature and having demulsifying characteristics are also suitable as, for example, the following products sold under the trade names AA-50 and AA-60 by the De-Hydro Company. A generally suitable amount of such demulsifying agents to employ is from about 0.1 to 2 per cent or more depending, of course, on the particular emulsion trouble encountered.

Illustrative of agents to be employed to emulsify the demulsifying agents in the acid are the dihexyl and diamyl esters of sodium sulpho-succinic acid, mahogany acid-soluble soaps, various alkylated aryl sulphonates, sulphonated vegetable oils, alkylated aromatic sulphonates, triethanol amine and glyceryl mono-ricinoleate. It should be mentioned that the emulsifying agent should be chosen with regard to the particular demulsifying agent to be emulsified. A suitable amount of the emulsifying agent to employ is from about 0.1 to 2 percent or more.

The suitability of the emulsifying agent for dispersing or emulsifying the particular demulsifying agent may be readily determined by mixing the two agents and adding them to water with stirring and observing whether a satisfactory emulsion is produced. As aforementioned, the solution of acid having emulsified therewith a demulsifying agent is highly mobile or fluent and flows with little or no increased resistance to flow in the small pores and flow channels comparing favorably with plain acid solutions in this respect.

It is also desirable to select the particular demulsifying agent to be employed with respect to the oil likely to be encountered during the treatment. This is best accomplished by obtaining a sample of oil which the acid will encounter during the treatment and conducting tests to ascertain what acid-insoluble demulsifying agent is most satisfactory in each particular case. Such tests may be conducted by bringing acid, having emulsified therewith, the various demulsifying agents, into contact with separate samples of oil. The mixture thus produced is then vigorously stirred or shaken and the time required for the two phases to completely separate noted. The agent effecting the quickest separation is preferably employed.

It has been found preferable in producing the treating solution to mix the emulsifying agent with the demulsifying agent and thereafter add the mixture to water. The water solution is then stirred in order to disperse or emulsify the demulsifying agent in the water. The solution so produced is then added to concentrated acid to produce an acid solution of the desired concentration. In the foregoing manner, emulsions of a more stable nature are produced and the results are more satisfactory than where the emulsifying agent and demulsifying agent are mixed and added directly to the acid prior to the dispersion or emulsification of the agent in water, although the latter method may be employed in some instances.

Hydrochloric acid will be commonly employed and a concentration of from 5 to 25 per cent is generally suitable. If desired, the acid solution may be conveniently inhibited against corrosive attack upon iron or steel in a manner now well known in the art. Acid solutions such as sulphuric, hydrofluoric, nitric and mixtures thereof may also be employed.

By employing an emulsified demulsifying agent in accordance with the present invention, greatly improved results are obtained as regards overcoming emulsion problems ordinarily encountered in carrying out the treatment of oil wells in the conventional manner wherein a partially or completely acid-insoluble demulsifying agent is employed.

I claim:

1. In a method of treating a well, the step which includes introducing into the well an acid solution containing an emulsified demulsifying agent capable of preventing and breaking emulsions between oil and said acid.

2. In a method of treating a well, the steps which include mixing an acid-insoluble demulsifying agent with an agent capable of emulsifying the demulsifying agent with water, adding the mixture to water, agitating the mixture so as to produce an emulsion of the demulsifying agent with the water, adding an acid to the aqueous solution so produced until an acid of the desired concentration is produced, and thereafter introducing the mixture into the well and thence into the surrounding formation.

3. In a method of treating a well, the steps which include mixing cresylic acid and an alkylated aromatic sulphonate, adding the mixture to water, agitating the mixture so as to produce an emulsion of cresylic acid with the water, adding an acid to the aqueous solution so produced until desired acid concentration is reached, and thereafter introducing the mixture into the well and thence into the surrounding formation.

4. The method of claim 2, wherein the demulsifying agent is cresylic acid and the emulsifying agent is the diamyl ester of sodium sulphosuccinic acid.

JOHN B. STONE.